(No Model.)
W. C. BODECTEL.
JUG OR PITCHER COVER.
No. 299,512. Patented June 3, 1884.
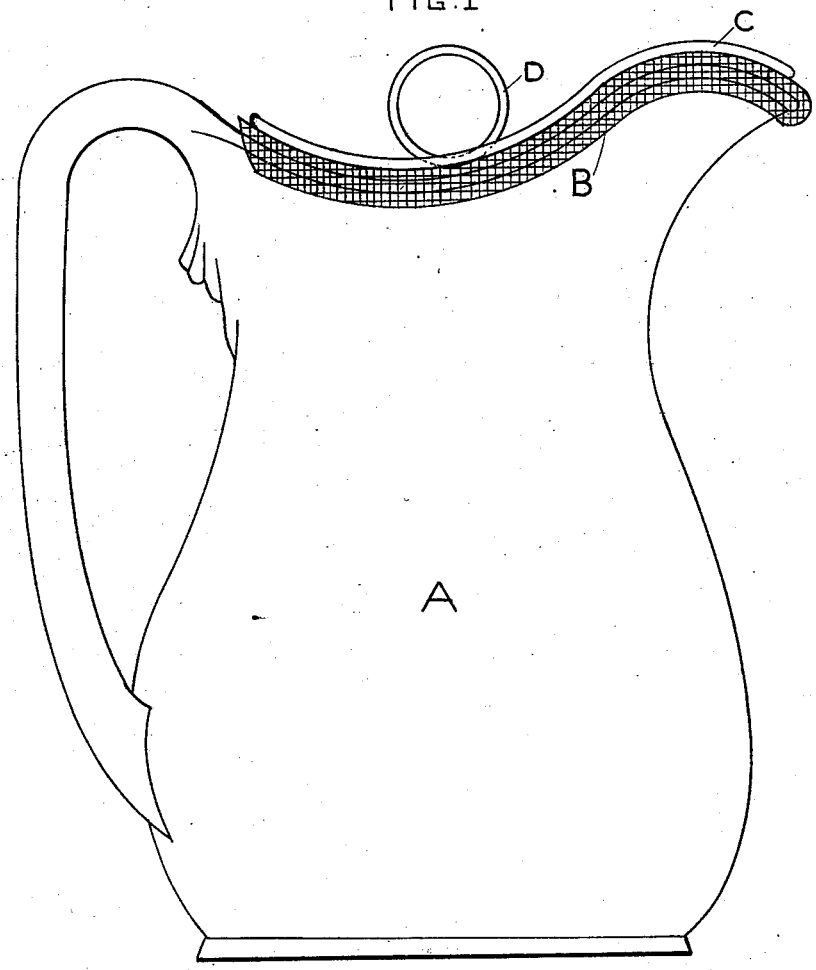
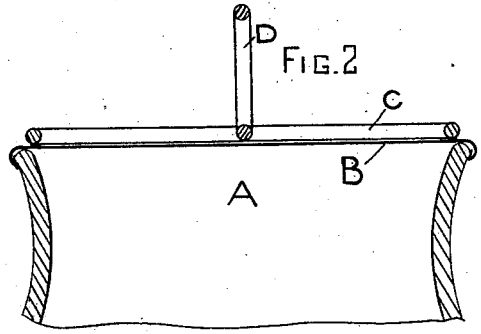
WITNESSES
INVENTOR
William C. Bodectel
by George Pardy
Atty

UNITED STATES PATENT OFFICE.

WILLIAM C. BODECTEL, OF SAN FRANCISCO, CALIFORNIA.

JUG OR PITCHER COVER.

SPECIFICATION forming part of Letters Patent No. 299,512, dated June 3, 1884.

Application filed April 11, 1884. (No model.)

*To all whom it may concern:*

Be it known that I, WILLIAM C. BODECTEL, a citizen of the United States, and a resident of the city and county of San Francisco, State of California, have invented a new and Improved Jug or Pitcher Cover, of which the following is a specification.

My invention relates to a removable cover for jugs or pitchers, applicable to any of the same size or pattern, and which cover, while permitting a free circulation of air within the pitcher, effectually keeps out insects and dust.

The invention consists in a wire-netting bent to fit the rim of the pitcher and overlapping its edges, which is stiffened with a wire rim soldered to the netting close to the edge.

In the accompanying drawings, forming part of this specification, Figure 1 is a side view of a pitcher having my cover applied thereon. Fig. 2 is a broken cross-section of the upper part of the pitcher, showing how my cover overlaps and hugs the edge thereof.

In both figures like letters of reference represent like parts.

A is the pitcher. B is the cover. C is a stiffening-rim, made of wire, running all around about a quarter of an inch from the edge of the cover and being firmly soldered thereto. D is a ring soldered to the middle of the cover to lift it by.

It will be observed in the drawings that the netting is curled over the edge, and is made a tight fit, so as to keep its position when the pitcher is inclined in the act of pouring out its contents. The netting should be made of brass wire silver-plated, and there will always be sufficient flange or curled-over edge to adjust the cover to any slight variations of shape of rim which one pitcher of the same pattern might have over another.

The wire stiffening-rim C is provided because it will make the cover more durable and more likely to keep its shape.

The advantage of this cover consists in its permitting air to circulate within the pitcher, so that the contents may be kept purer, and in case of milk prevented from soon souring, and it is cheaper than having a metal cover permanently attached to a pitcher with a hinged joint. The pitcher and the cover can also be easily cleaned in a thorough manner, and when the pitcher is broken the cover will answer for any other of like shape.

What I claim as my invention, and desire to secure by Letters Patent, is as follows:

The pitcher-cover herein described, consisting of the combination of the wire-netting with curled-over edges closely hugging the rim of the pitcher, and the stiffening-rim C, soldered thereto, as and for the purpose described.

WILLIAM C. BODECTEL.

Witnesses:
GEORGE PARDY,
WM. MITCHELL.